United States Patent
Prigent

(10) Patent No.: US 8,182,674 B2
(45) Date of Patent: May 22, 2012

(54) SOLID PARTICLE SEPARATOR DEVICE AND A HYDRAULIC INSTALLATION INCLUDING SUCH A DEVICE

(75) Inventor: Serge Prigent, Le Sappey en Chartreuse (FR)

(73) Assignee: ALSTOM Hydro France, Levallois Perret (FR)

( * ) Notice: Subject to any disclaimer, the term of this patent is extended or adjusted under 35 U.S.C. 154(b) by 423 days.

(21) Appl. No.: 12/458,583

(22) Filed: Jul. 16, 2009

(65) Prior Publication Data

US 2010/0013232 A1 Jan. 21, 2010

(30) Foreign Application Priority Data

Jul. 18, 2008 (FR) ..................... 08 54902

(51) Int. Cl.
*E02B 9/06* (2006.01)
*F03B 11/08* (2006.01)

(52) U.S. Cl. ............. 210/153; 210/251; 210/416.1; 210/433.1; 210/512.1; 415/169.1; 415/121.2; 405/75; 405/78; 290/54; 60/454

(58) Field of Classification Search .......... None
See application file for complete search history.

(56) References Cited

U.S. PATENT DOCUMENTS

| | | | | |
|---|---|---|---|---|
| 1,836,758 A | * | 12/1931 | Knapp | ............. 55/424 |
| 1,960,485 A | | 5/1934 | Karl Enz | |
| 2,084,958 A | * | 6/1937 | Hunter | ............. 516/197 |
| 3,507,479 A | | 4/1970 | Pearl | |
| 3,725,271 A | * | 4/1973 | Giannotti | ............. 210/767 |
| 3,853,512 A | * | 12/1974 | Hayashi | ............. 96/59 |
| 3,956,131 A | * | 5/1976 | Harvey | ............. 210/202 |
| 4,092,828 A | * | 6/1978 | Garza | ............. 60/506 |
| 4,276,171 A | * | 6/1981 | Jackson | ............. 210/437 |
| 4,622,132 A | | 11/1986 | Chupka | |
| 4,629,904 A | * | 12/1986 | Rojo et al. | ............. 290/52 |
| 4,650,581 A | | 3/1987 | Angles et al. | |
| 4,786,387 A | * | 11/1988 | Whitlock | ............. 204/547 |
| 4,927,437 A | * | 5/1990 | Richerson | ............. 55/349 |
| 4,941,771 A | * | 7/1990 | Perper | ............. 405/78 |
| 5,248,421 A | | 9/1993 | Robertson | |
| 5,338,450 A | * | 8/1994 | Maurer | ............. 210/286 |
| 5,575,909 A | | 11/1996 | Foster | |
| 6,269,287 B1 | * | 7/2001 | March | ............. 700/287 |

(Continued)

FOREIGN PATENT DOCUMENTS

DE 421266 11/1925
(Continued)

*Primary Examiner* — Robert James Popovics
(74) *Attorney, Agent, or Firm* — Dowell & Dowell, PC

(57) ABSTRACT

The device (100) serves to separate solid particles from the water of a flow (E) feeding a hydraulic machine of the turbine, pump, or turbine-pump type. The device has flow inlet and outlet zones (104, 105) for the flow that are spaced apart along an advance axis ($X_{100}$) of flow advance through the device (100). The device (100) comprises a plurality of ducts (110) placed in parallel, each having a mouth and a downstream end between the inlet zone (104) and the outlet zone (105). In section perpendicular to the advance axis ($X_{100}$), each duct presents a section in the form of a spiral with a radius of curvature that increases from the mouth towards the downstream end or from the downstream end towards the mouth, with each duct (110) presenting a thickness measured in a generally radial direction relative to the advance axis that is less than 10% of the width ($l_{110}$) of said duct, measured parallel to said axis ($X_{100}$).

13 Claims, 11 Drawing Sheets

U.S. PATENT DOCUMENTS

| | | | |
|---|---|---|---|
| 6,602,180 B2 * | 8/2003 | Herman et al. | 494/75 |
| 6,652,439 B2 * | 11/2003 | Herman et al. | 494/75 |
| 6,656,362 B1 * | 12/2003 | Kihara et al. | 210/652 |
| 7,478,974 B1 * | 1/2009 | Kelly | 405/78 |
| 7,972,108 B2 * | 7/2011 | Fonkenell | 415/126 |
| 8,082,067 B2 * | 12/2011 | Nicoson | 700/290 |
| 2004/0237484 A1 | 12/2004 | Altvater et al. | |
| 2007/0286715 A1 * | 12/2007 | Fonkenell | 415/129 |
| 2008/0128331 A1 | 6/2008 | Lean et al. | |
| 2010/0013232 A1 * | 1/2010 | Prigent | 290/54 |
| 2010/0126480 A1 * | 5/2010 | Shieh | 123/573 |
| 2010/0140934 A1 * | 6/2010 | Nicoson | 290/43 |
| 2010/0260622 A1 * | 10/2010 | Couston et al. | 417/375 |
| 2011/0271675 A1 * | 11/2011 | Toulouse | 60/639 |
| 2011/0293400 A1 * | 12/2011 | Bremond et al. | 415/1 |

FOREIGN PATENT DOCUMENTS

| | | |
|---|---|---|
| DE | 1129458 | 5/1934 |
| DE | 742832 | 12/1943 |
| EP | 1407807 | 4/2004 |
| EP | 1970561 A1 * | 9/2008 |
| EP | 2147710 A1 * | 1/2010 |
| FR | 2941470 A1 * | 7/2010 |
| FR | 2941502 A1 * | 7/2010 |
| WO | WO 2010084288 A2 * | 7/2010 |

* cited by examiner

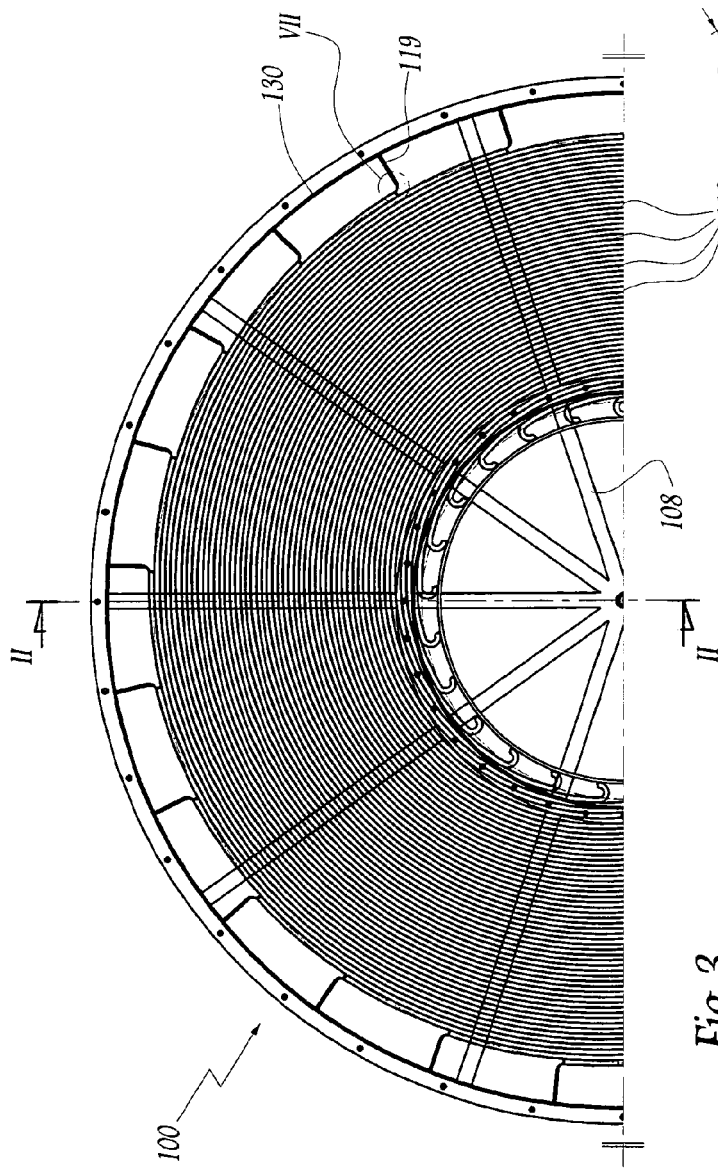
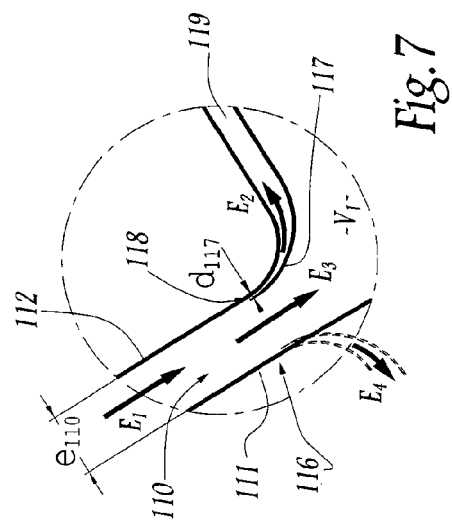

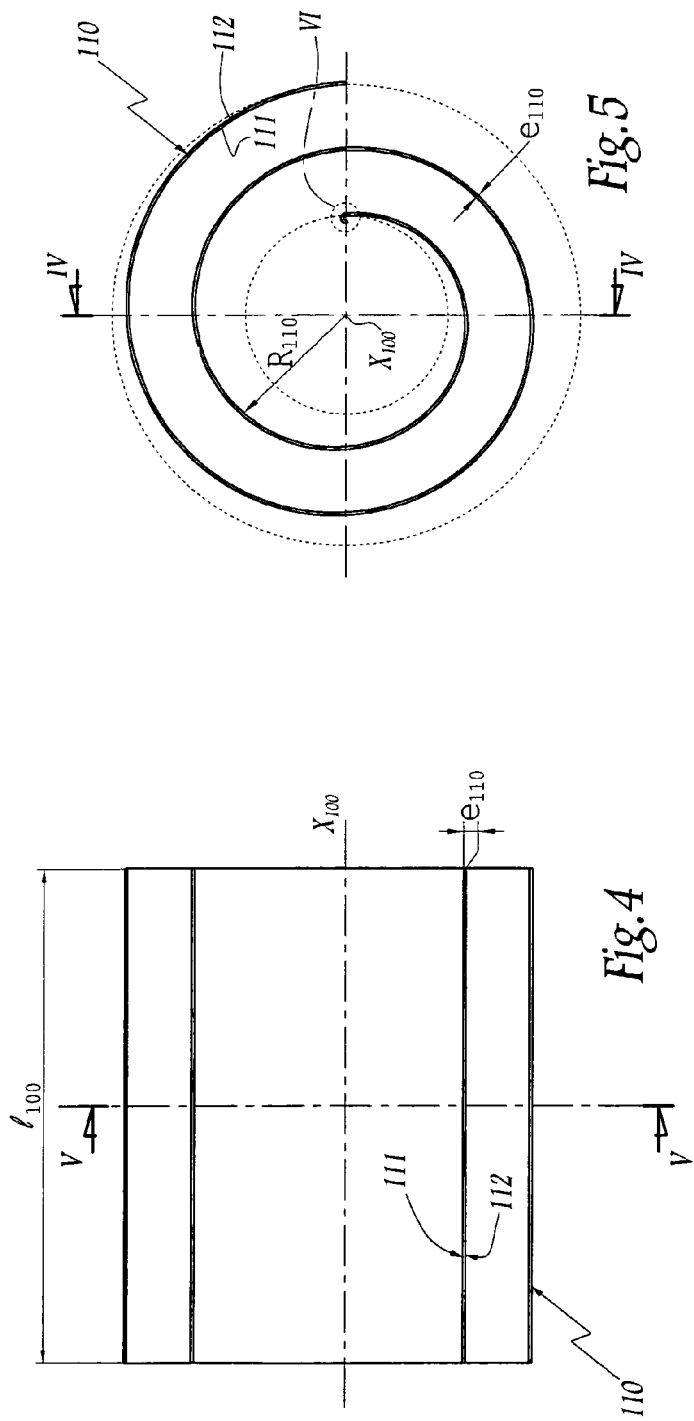

SOLID PARTICLE SEPARATOR DEVICE AND A HYDRAULIC INSTALLATION INCLUDING SUCH A DEVICE

The invention relates to a device for separating solid particles from the water of a flow, and also to an energy conversion installation including such a device.

In the field of installations for converting hydraulic energy into electrical or mechanical energy, it is known to feed a hydraulic machine, such as a turbine, with a flow of water that interacts with the blades of the turbine. Depending on weather conditions and on the nature of the ground through which it passes, the flow may carry a greater or smaller burden of solid particles, e.g. grains of sand, which particles subject the portions of the machine with which they come into contact to wear.

Various devices are known for retaining or separating these solid particles from the water of the flow. They comprise in particular dams and settling basins, filter grids, and sand-trap tunnels. A sand-trap tunnel is a duct provided underground and within which the flow that is to feed a hydraulic machine travels at relatively slow speed, thereby enabling at least a fraction of the solid particles contained in the incoming flow to settle out on a grid at the bottom of the tunnel. Given the settling speed of such particles, it is necessary for the tunnel to be long, in particular for it to have a length greater than 150 meters (m), and for it to present a cross-section of area that is sufficient to reduce the speed of the flow to a level that is compatible with its settling speed. This gives rise to large-scale civil engineering works, thereby correspondingly increasing the cost of setting up and the cost of operating a prior art hydraulic installation. In addition, such sand-trap tunnels are not very effective insofar as the solid particle content, after a flow has passed through such a device, is reduced by about 50% only.

The present invention seeks more particularly to remedy these drawbacks by proposing a novel separator device in which solid particles can be separated effectively from the water of a flow, while the size of the device is significantly reduced compared with a sand-trap tunnel, and its efficiency is improved.

To this end, the invention provides a device for separating solid particles from water in a flow feeding a hydraulic machine of the turbine, pump, or turbine-pump type, the device having flow inlet and outlet zones that are spaced apart along an advance axis of flow advance through the device. This device is characterized in that it comprises a plurality of ducts placed in parallel, each having a mouth and a downstream end between the inlet zone and an outlet zone, in that, in section perpendicular to the advance axis, each duct presents a section of spiral shape with a radius of curvature increasing from the mouth towards the downstream end or from the downstream end towards the mouth, and in that each duct presents a thickness measured in a direction that is generally radial relative to the advance axis that is less than 10% of the width of said duct, measured parallel to said axis.

By means of the invention, the various ducts of spiral-shaped section serve to use centrifugal force for separating the solid particles from the water of the flow, and their thickness that is small compared with their width is compatible with a settling time that is relatively short as results from the speed acquired by the flow in each spiral. The shape of the various ducts enables a high flow rate to be processed that is compatible with feeding a high-power hydraulic machine. In addition, the structure of the device with a plurality of ducts connected in parallel allows the device to be compact, thereby reducing the associated amount of civil engineering work and expense.

According to aspects of the invention that are advantageous but not essential, such a device may incorporate one or more of the following features:

- The thickness of each duct is less than 5%, and preferably less than 1% of the width of the duct.
- The thickness of each duct has a value of less than 100 millimeters (mm), preferably less than 60 mm, more preferably equal to about 50 mm.
- Each duct has an inlet section of flat rectangular shape with its long dimension parallel to the above-mentioned advance axis.
- At its outlet, each duct is fitted with a flow separator suitable for separating a first portion of an elementary flow flowing in the duct from a second portion thereof, the first portion being heavily burdened with solid particles while the second portion has a lighter burden of solid particles. In such a case, the flow separator is advantageously formed by a partition placed in the duct, close to a radial partition of the duct, and at a distance therefrom.
- In the vicinity of its inlet, each duct includes a zone of radius of curvature measured in a plane perpendicular to the advance axis that is less than 25% of the maximum radius of curvature of the duct in said plane.
- In an embodiment of the invention, the ducts are interleaved one in another around the advance axis. In a variant, the ducts are distributed in respective angular sectors around the advance axis.
- Each duct is formed by one or two metal sheets that are rectilinear in their direction parallel to the advance axis.

The invention also provides an installation for converting hydraulic energy into electrical or mechanical energy, or vice versa, said installation comprising a hydraulic machine of the turbine, pump, or turbine-pump type, and a line for feeding the machine with water. The installation is characterized in that it also comprises at least one device for separating solid particles from water, as mentioned above.

Such an installation is easier to put into service and less expensive than are installations in the state of the art.

The invention will be better understood and other advantages thereof appear more clearly in the light of the following description of two embodiments of a separator device and an energy conversion installation in accordance with the principle of the invention, given purely by way of example and made with reference to the accompanying drawings, in which:

FIG. 3 is a half-section on line III-III in FIG. 2, with the section plane of FIG. 2 being reference II-II therein;

FIG. 4 is a section in the same plane as FIG. 2, but on a smaller scale, and it shows one of the separator ducts of the device of FIGS. 2 and 3;

FIG. 5 is a section on line V-V of FIG. 4, with the section plane of FIG. 4 being referenced IV-IV therein;

FIG. 6 is a larger-scale view of a detail VI of FIG. 5;

FIG. 7 is a view on a larger scale of detail VII of FIG. 3;

Figure 1:
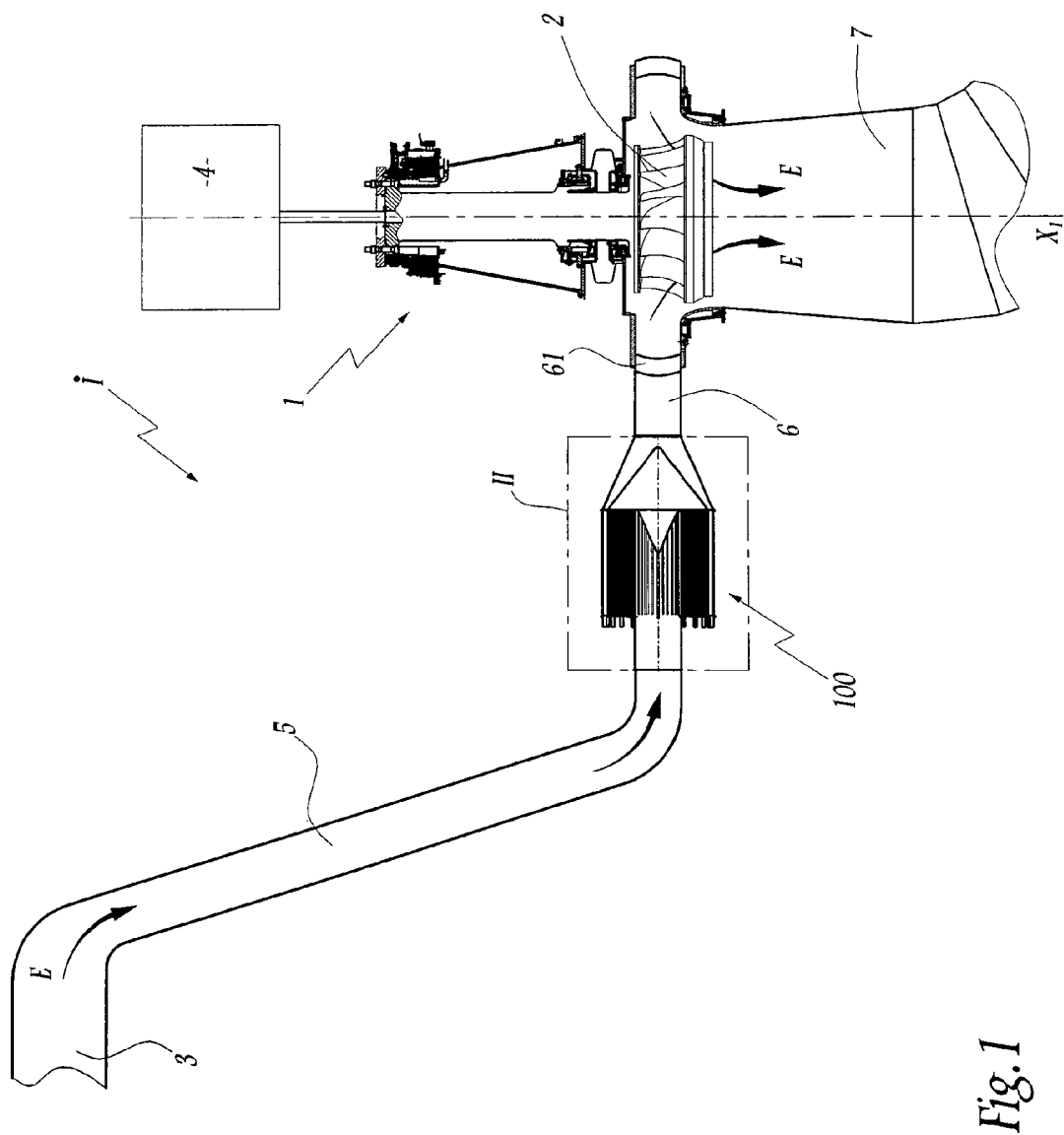
FIG. 1 is a diagram showing the principle of an installation in accordance with the invention.
Figure 2:
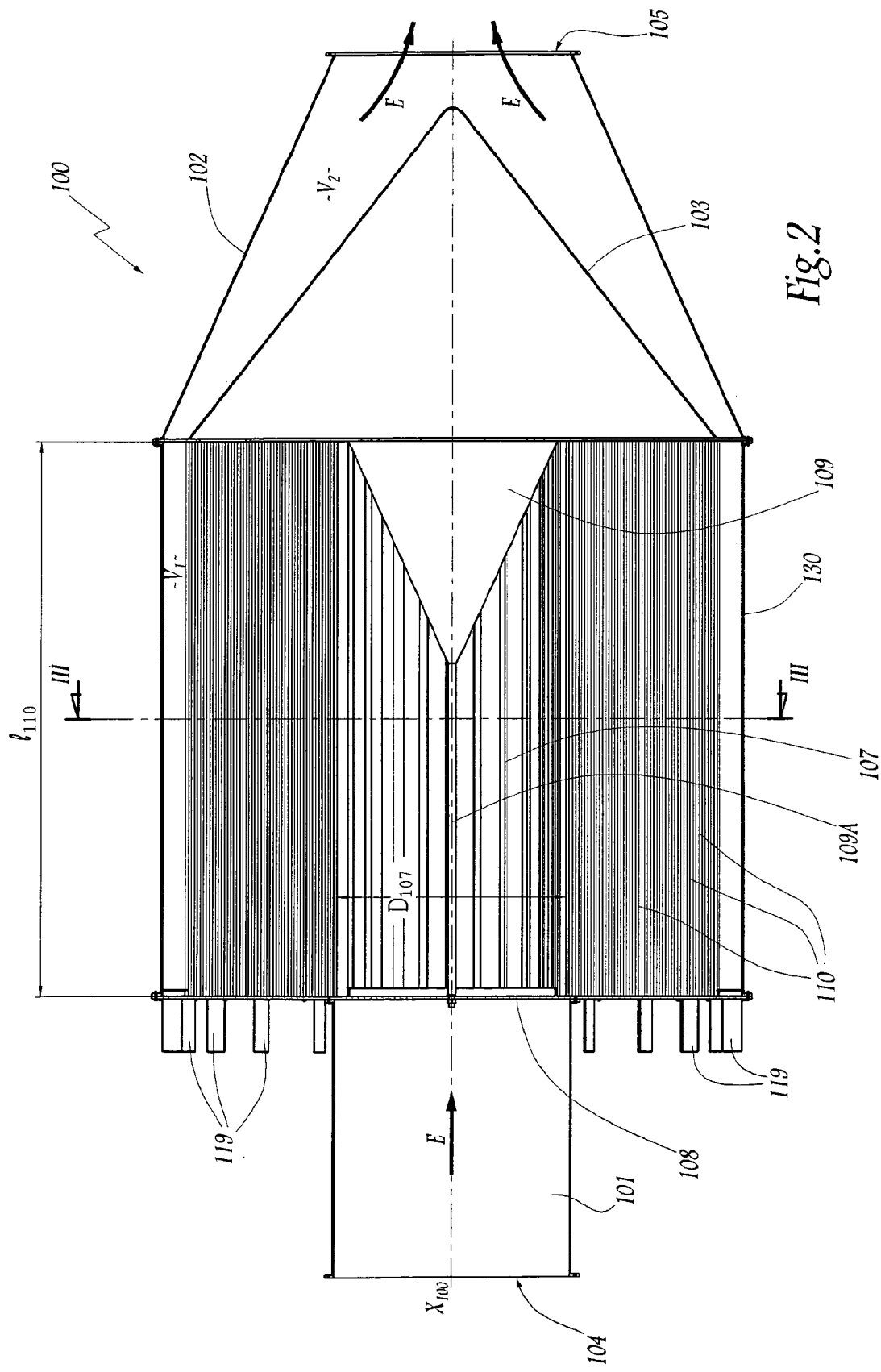
FIG. 2 is a view on a larger scale of the solid particle separator device of the FIG. 1 installation, this figure corresponding to detail II of FIG. 1.
Figure 8:
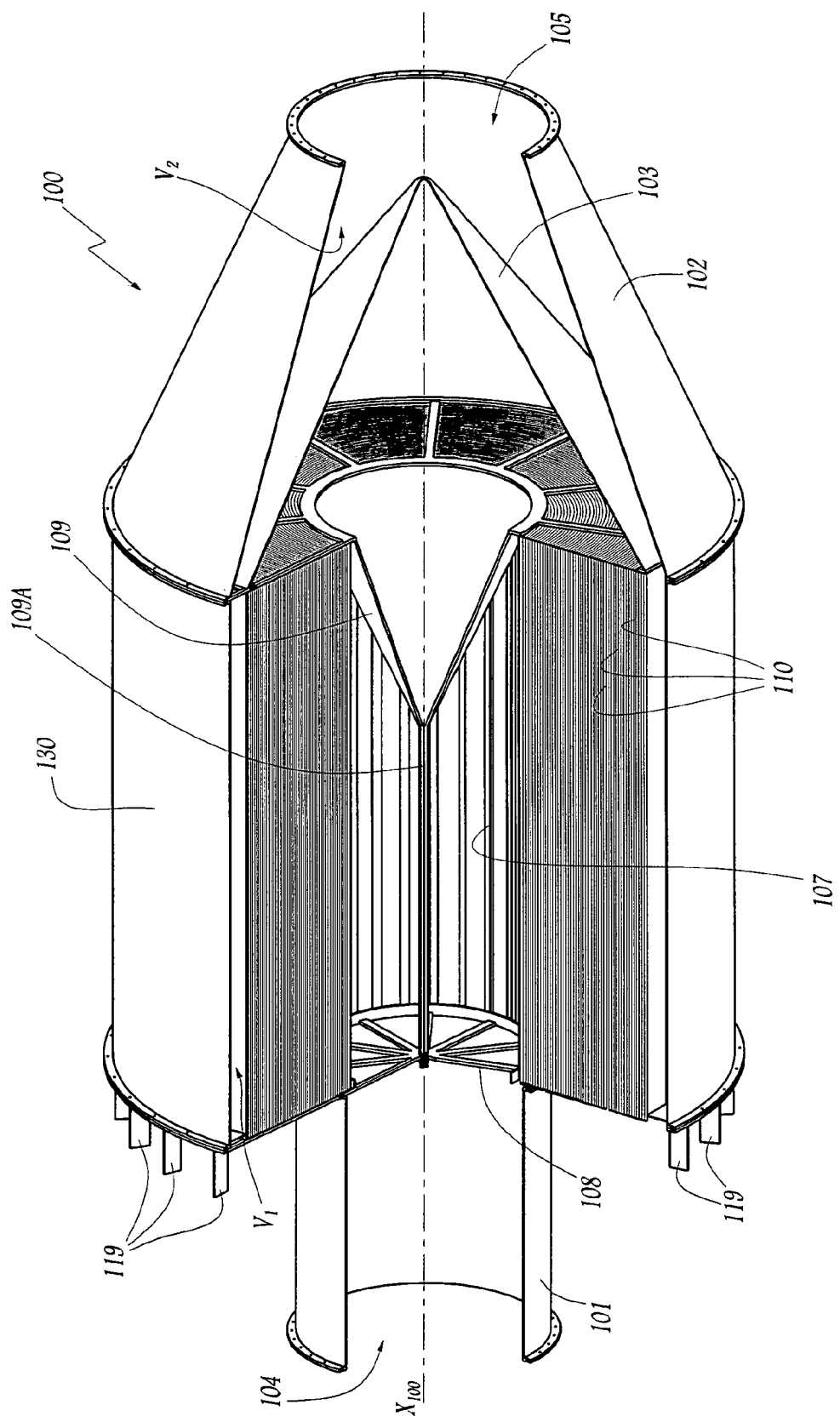
FIG. 8 is a partially cutaway perspective view of the device of FIGS. 2 to 7.
Figure 9:
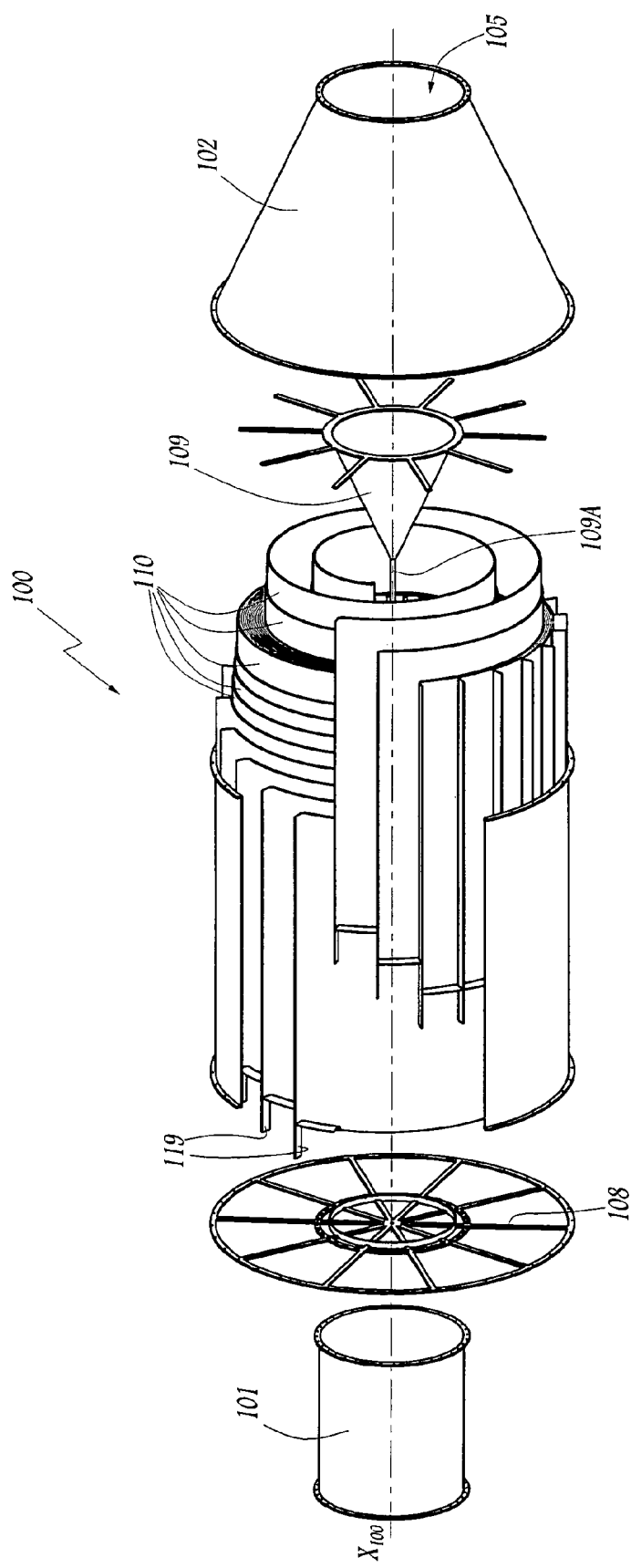
FIG. 9 is an exploded perspective view of certain portions of the device of FIGS. 2 to 8.
Figure 10:
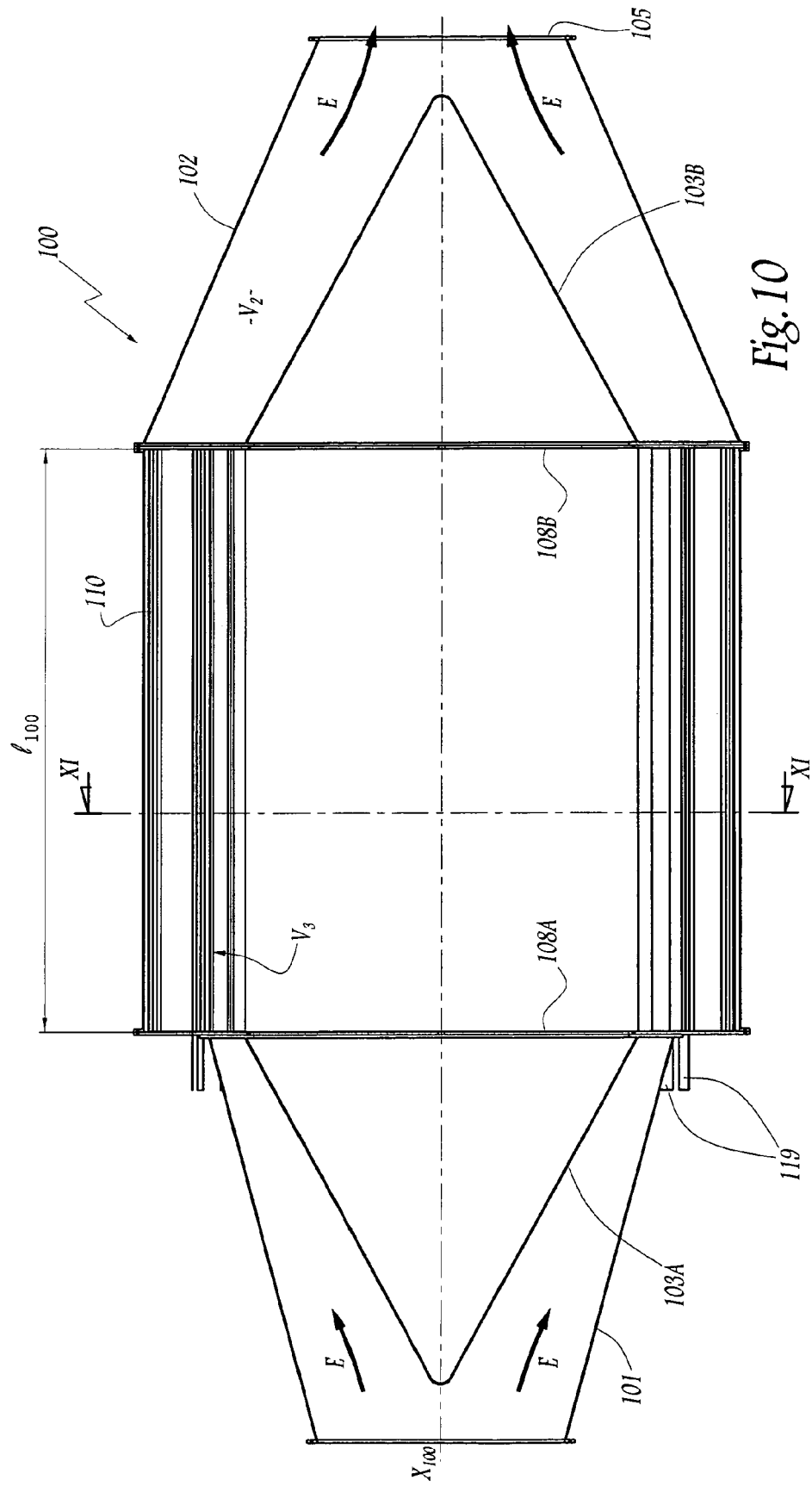
FIG. 10 is an axial section analogous to FIG. 2 and showing a device constituting a second embodiment.
Figure 11:
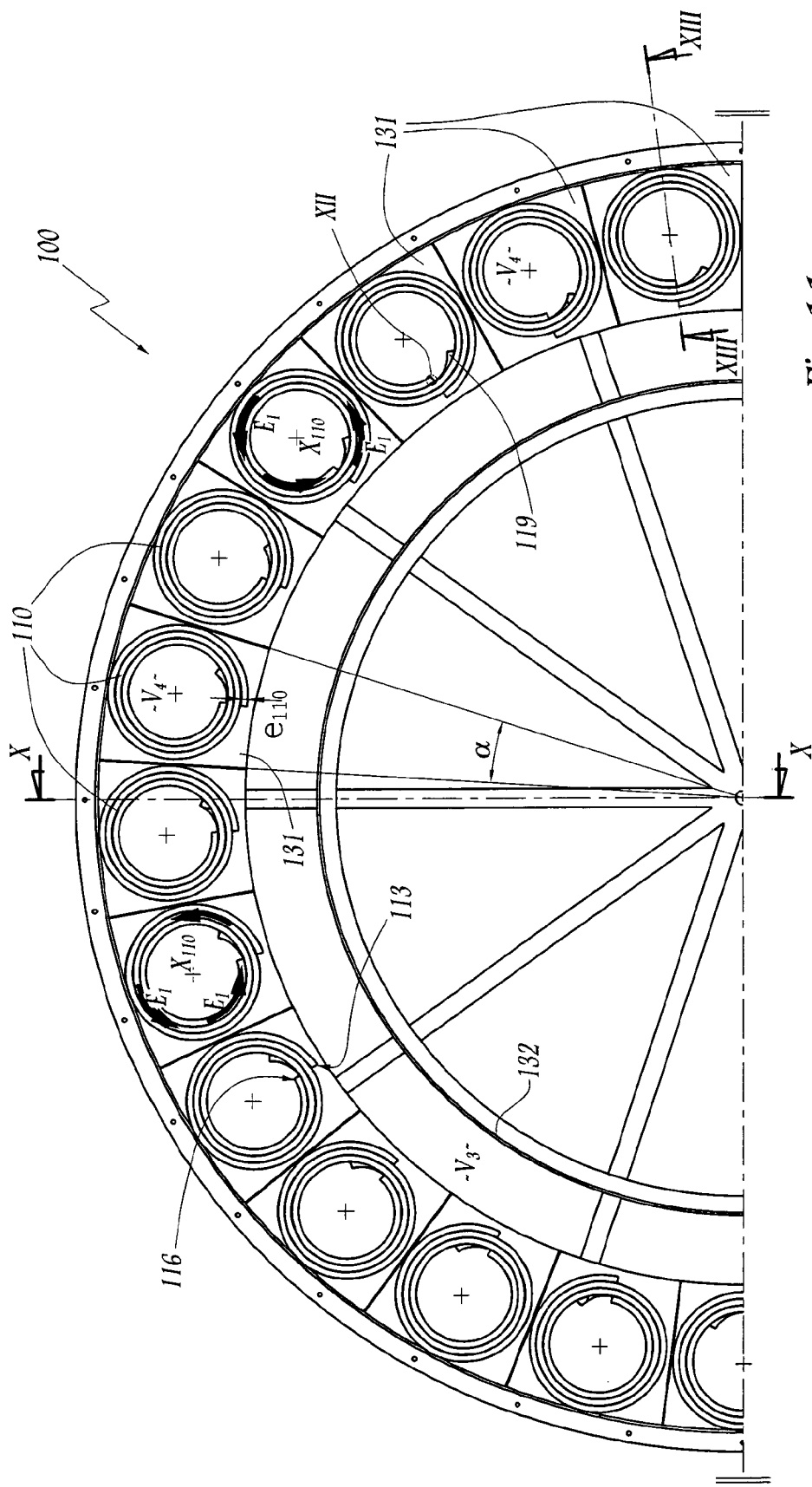
FIG. 11 is a half-section on line XI-XI of FIG. 10, with the section plane of FIG. 10 having the reference X-X therein.
Figure 12:
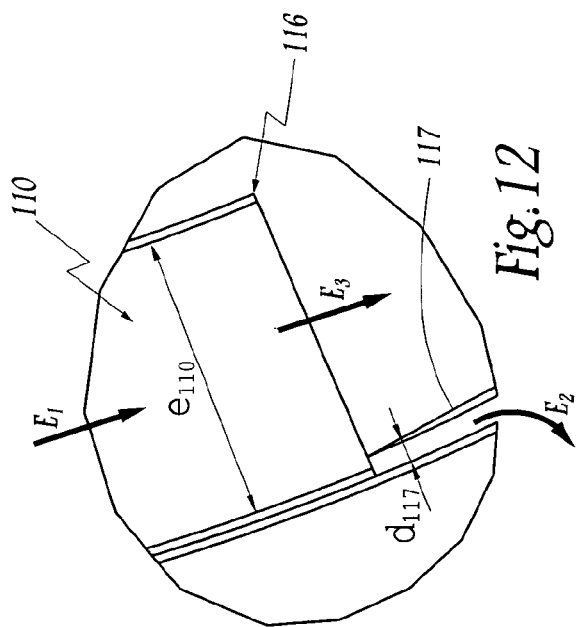
FIG. 12 is a view on a larger scale of detail XII of FIG. 11.
Figure 13:
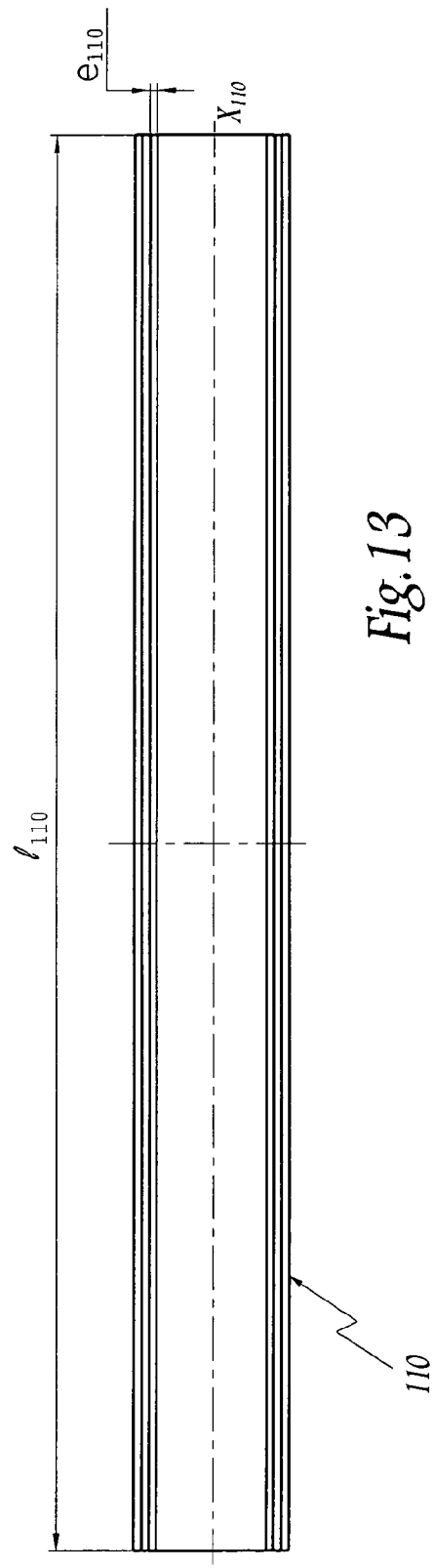
FIG. 13 is a fragmentary section on line XIII-XIII of FIG. 11.
Figure 14:
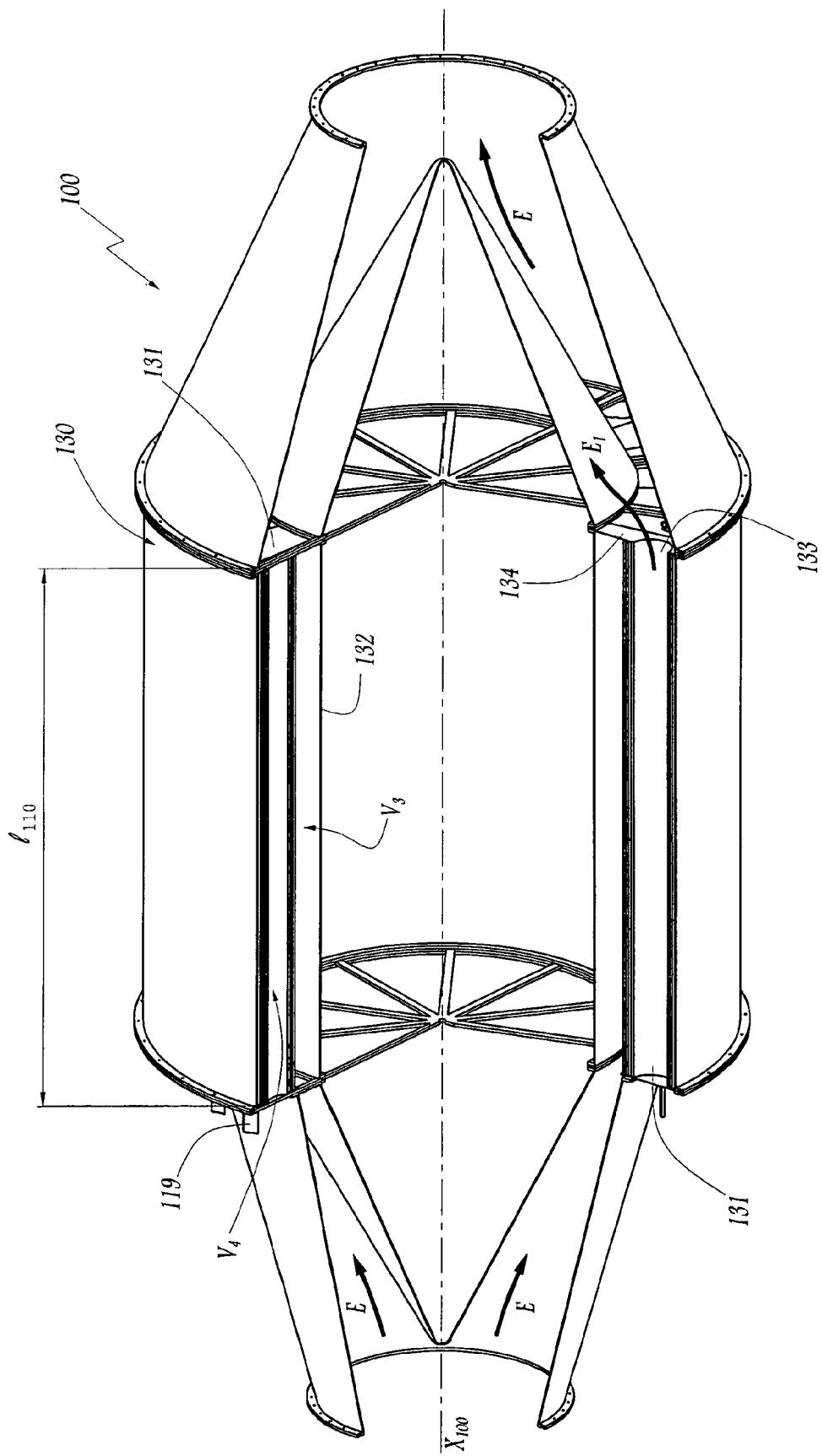
FIG. 14 is a partially cutaway perspective view of the device of FIGS. 10 to 13.
Figure 15:
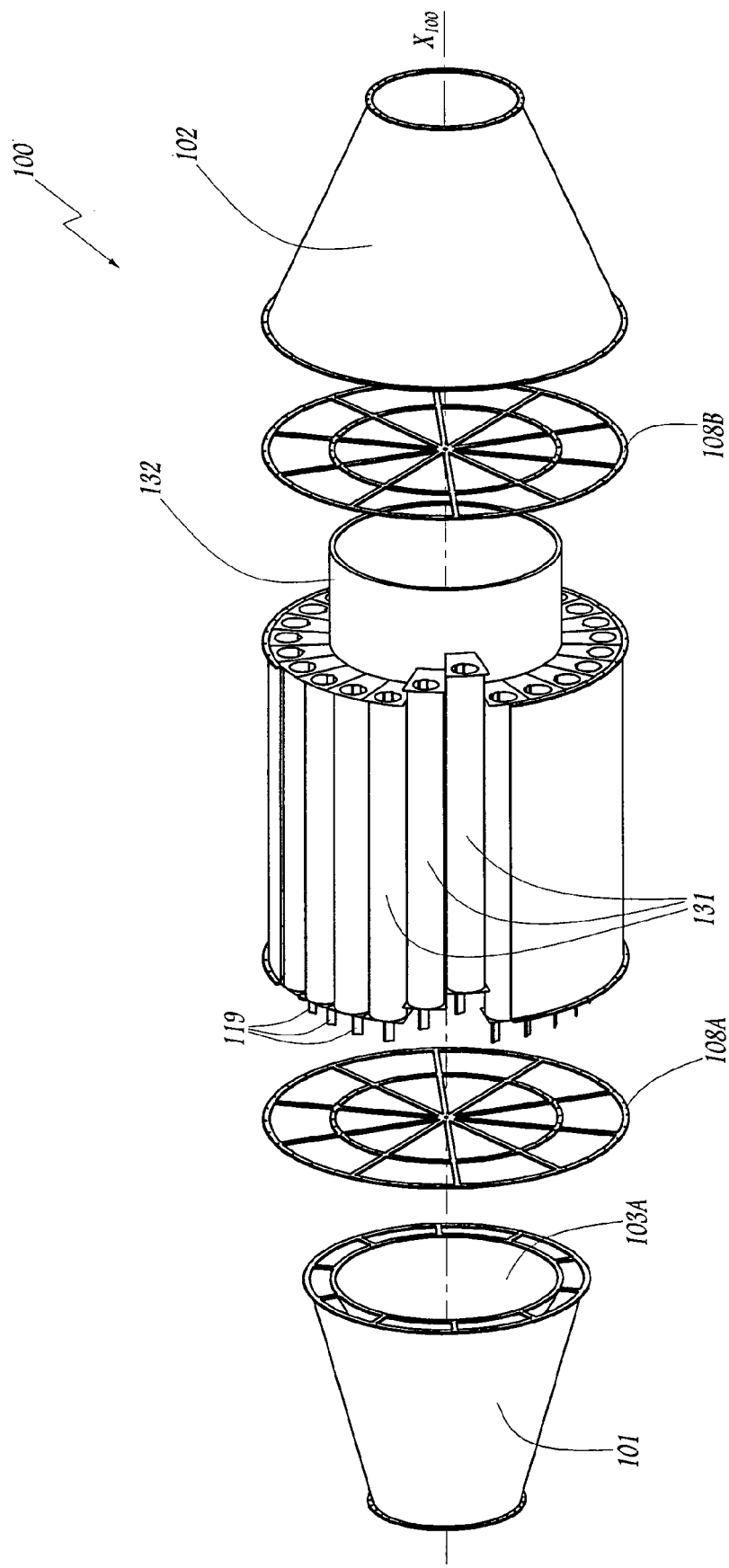
FIG. 15 is an exploded perspective view of certain portions of the device of FIGS. 10 to 14.

The installation I shown in FIG. 1 comprises a turbine 1 of the Francis type with its wheel 2 designed to be set into rotation about a vertical axis $X_1$ by a forced flow E coming from a water intake 3 that takes its flow from a reservoir, such as a dam, or from an un-dammed stream. The turbine 1 is coupled to an alternator 4 that delivers alternating current to an electricity network (not shown) as a function of rotation of the wheel 2.

A penstock 5 bringing the flow E to the wheel 2 extends between the water intake 3 and a feed tank 6 fitted with guide vanes 61 for regulating the flow E. A suction pipe 7 is provided to convey the flow E downstream from the installation I.

A device 100 that is interposed between the water intake 3 and the tank 6 is used for separating the solid particles that are to be found in the flow E from the water that constitutes said flow. The device 100 comprises an inlet duct 101 of cylindrical shape with circular section centered on a horizontal axis $X_{100}$ that constitutes a longitudinal axis of the device 100. At its outlet, the device 100 is provided with a frustoconically-shaped collector 102 placed around a pointed portion 103 of conical shape. The inlet orifice 104 of the duct 101 constitutes the inlet to the device 100, and a circular opening 105 formed at the end of the collector 102 constitutes an outlet orifice for the flow E. The orifice 104 is designed to be connected to the bottom portion of the pipe 5, and the opening 105 is designed to be connected to the inlet to the feed tank 6.

Between the inlet and outlet zones 104 and 105 of the device 100, the flow E advances parallel to the axis $X_{100}$.

Between the duct 101 and the collector 102, the device 100 has twenty-five mutually interleaved ducts 110 arranged in a spiral around the axis 100. In a plane perpendicular to the axis $X_{100}$, and as shown in FIGS. 3 and 5, each duct 110 has a section of spiral shape. Each duct 110 is defined by an inner metal sheet 111 and an outer metal sheet 112. The inner metal sheet 111 of a first duct may act as the outer metal sheet 112 of an adjacent duct situated radially inside the first duct. Similarly, the outer sheet 112 of a first duct may act as the inner sheet of a second adjacent duct situated radially outside the first duct.

The twenty-five ducts 110 are interleaved insofar as the major fraction of the length of each duct 110 lies radially between two other ducts 110, as can be seen in FIG. 3. The ducts 110 all have the same length, width, and thickness.

The length L110 of a duct 110 is its developed length around the axis $X_{100}$. In other words, the length of a duct 110 is its length that can be seen in FIG. 5. The width $l_{100}$ of a duct 110 is its dimension parallel to the axis $X_{100}$. The thickness $e_{110}$ of a duct 110 is its radial thickness, i.e. the distance between its inner and outer sheets. In practice the length $L_{110}$ of a duct 110 is of the order of 20 m, whereas its width $l_{110}$ is of the order of 10 m, and its thickness $e_{110}$ is of the order of 50 mm. Thus, each duct 110 is in the form of a slot of a width that is much greater than its thickness.

In practice, the thickness $e_{110}$ is selected to be less than 100 mm, and preferably less than 60 mm. Calculations and tests with $e_{110}$ equal to 50 mm have given satisfactory results.

Given the shape of the various ducts 110, each of them has a respective inlet zone in the form of a rectangle with its long dimension corresponding to the width $l_{110}$ and with its short dimension corresponding to the thickness $e_{110}$.

The invention can be implemented once the ratio of $e_{110}$ over $l_{110}$ is less than 0.1. In practice, it is preferable for this ratio to be less than 0.05 or even less than 0.01. In the example shown, this ratio is 50/10,000=0.005.

A central zone 107 of the device 100 is defined between a grid 108 for stiffening the device 100 and for retaining large pieces of waste, that is placed at the outlet from the duct 101, and a cone 109 that is centered on the axis $X_{100}$ and that converges towards the grid 108, i.e. upstream. A stiffener rod 109a extends the cone 109 as far as the grid 108, also being centered on the axis $X_{100}$. Thus, the flow of water E passing through the duct 101 and the grid 108 reaches the zone 107 from which it is deflected by the cone 109 radially outwards from the axis $X_{100}$, thus penetrating into the various ducts 110. Each duct 110 has a flow section equal to its width multiplied by its thickness, i.e. 0.05 m×10 m=0.5 square meters (m²). Thus, the total flow section of the twenty-five ducts 110 between the zone 107 and the inside volume of the collector 102 is 25×0.5 m²=12.5 m². This is suitable for handling a flow E at a large rate suitable for driving the turbine 1 at full speed.

Under such circumstances, assuming that the section $S_5$ of the penstock 5 has an area of 12.5 m², and assuming that the flow E through the penstock 5 and through the device 100 flows at the same rate, then the linear speed of the flow E is conserved between the penstock 5 and the device 100. This speed may lie in the range 5 meters per second (m/s) to 10 m/s, for example it may be 8 m/s.

It is also possible to provide for the linear speed of the flow E in the device 100 to increase relative to its value in the penstock 5. For example, with the flow E having a linear speed in the penstock 5 that is equal to 8 m/s, it is possible to arrange for the flow E to have a linear speed in the duct 110 that is equal to 24 m/s. Such a value of 24 m/s is high enough to give rise to effective separation of solid particles from the water molecules by centrifugation, but low enough to avoid premature wear of the sheet metal constituting the device 100 due to abrasion. Such wear is observed for linear speeds greater than 30 m/s and concentrations of sand in the water exceeding 1000 parts per million (ppm) by weight.

The linear speed of the flow E in the penstock 5 is written $V_5$. The flow rate of the flow in the penstock is thus given by:

$$Q_5 = S_5 \times V_5$$

The linear speed of the flow E in the ducts 110 of the device 100 is written $V_{100}$. The sum of the areas of the ducts 110 is written $S_{100}$, and is equal to $N \times S_{110}$ where N is the number of ducts 110 and $S_{110}$ is the area of the cross-section of one duct 110. $S_{110}$ is equal to $e_{110} \times l_{110}$. The flow rate of the flow E through the device 100 is thus:

$$Q_{100} = S_{100} \times V_{100} = N \times S_{110} \times V_{100} = N \times e_{110} \times S_{110} \times V_{100}$$

By flow conservation, this gives:

$$Q_5 = Q_{100}$$

i.e.:

$$S_5 \times V_5 = N \times e_{110} \times l_{110} \times V_{100}$$

This equation makes it possible to dimension the width $l_{110}$ and the thickness $e_{110}$ of the ducts 110. In the example where $V_{100}$ equals 24 m/s, whereas $V_5$=8 m/s, and $S_5$ is 12.5 m², this gives:

$$e_{110} \times l_{110} = (S_5 \times V_5)/(N \times V_{100}) = 1/3 \times S_5/25$$

For $e_{110}$ set at 50 mm, this makes it possible to determine the value of $l_{110}$, i.e.

$$l_{110} = 1/0.05 \times 1/3 \times 12.5/25 = 3.33 \text{ m}$$

Under such circumstances, the ratio $e_{110}/l_{110}$ is 1.5%.

If the width $l_{110}$ is set at 10 m, and the thickness $e_{110}$ is set at 50 mm, in the context of standardized production for the ducts or tubes 110, it is possible to act on the number of tubes to obtain a predetermined speed in the tubes 110. Thus, with eight tubes the speed $V_{100}$ becomes 25 m/s.

The zone 107 has a diameter $D_{107}$ of the order of 4 m. The inlet openings to the various ducts 110 are distributed at the periphery of the zone 107.

The radius of curvature of a duct 110 in the plane of FIG. 5 is written $R_{110}$. This radius of curvature has a value that increases from about 2 m to about 4.7 m.

An elementary portion of the flow E passing via a duct 110 is written $E_1$. Such a portion $E_1$ is subjected to centrifugal acceleration due to the curved shape of the duct 110 in the plane of FIG. 5. This acceleration acts both on the water molecules and on the solid particles present in the duct 110, with a differential effect given the density difference between said molecules and said particles.

FIG. 6 shows the upstream zone 113 of a duct 110, and in particular its mouth 114 which is of thickness $e_{110}$, as mentioned above. The zone 113 includes a bend portion 115 with radius of curvature $R_{115}$ of 50 mm, i.e. much less than the radius of curvature $R_{110}$ about the axis $X_{100}$. This bend portion 115 has the effect of imparting intense and localized centrifugal acceleration to each elementary flow $E_1$. This localized centrifugal acceleration has the effect of beginning to direct the solid particles in an elementary flow $E_1$ that penetrates into a duct 110 towards the outer sheet 112 of the duct.

Given the differential effect of the centrifugal acceleration that results from the spiral path of the flow $E_1$ in the remainder of the duct 110, these particles subsequently move closer and closer to the outer sheet 112. Thus, the solid particles tend to accumulate in the vicinity of the outer sheet 112 of each duct 110.

Insofar as the solid particle separation effect depends on the radial speed and on the tangential speed $V_{110}$ of the flow $E_1$ in each duct 110, it is preferable for the inlet hydraulic pressure of the flow V into the device 100 to be relatively high. That is why the device 100 is placed at the bottom portion of the penstock 5, i.e. in its downstream portion. In a variant of the invention that is not shown, the device 100 can be installed in an intermediate part of the penstock 5, providing the hydraulic pressure of the flow is sufficient.

In the vicinity of the downstream end 116 of a duct 110, a separator sheet 117 is placed at a non-zero radial distance $d_{117}$ from the outer sheet 112 of each duct 110, thereby defining between the sheets 112 and 117 a slot 118 into which the portion $E_2$ of the elementary flow $E_1$ that has the greatest burden of solid particles flows since these particles have accumulated in the vicinity of the sheet 112 while traveling along the duct 110. A drain 119 is connected downstream from each slot 118 and the various drains 119 of the ducts are themselves connected to a discharge duct (not shown) for discharging the portion of the flow E carrying the heaviest burden of solid particles. The distance $d_{117}$ is the thickness of the slot 118.

In practice, the distance $d_{117}$ may be of the order of 0.5 mm, such that the portion $E_2$ of each flow $E_1$ that is taken off to be conveyed towards the drains 119 is minimal relative to said flow. The ratio $d_{117}/e_{110}$ is selected to be less than 1/50. It is advantageously about 1/100, as in the example shown. This ratio is selected to have a small value since the flow $E_2$ corresponds to a lost water percentage.

The remaining portion $E_3$ of each flow $E_1$ is then directed to a volume $V_1$ defined radially around the ducts 110 and defined radially on the outside by a sheet 130 of cylindrical shape and of circular section. This volume $V_1$ leads to a volume $V_2$ defined between the portion 103 and the collector 102, such that the various portions $E_3$ of the flow $E_1$ that are not deflected towards the drains 119 are sent together towards the feed tank 6 through the opening for feeding the turbine 1.

According to an aspect of the invention that is shown in dashed lines solely in FIG. 7, it is possible to provide a second separator sheet 121 in the vicinity of the inner sheet 111 of a duct 110, thereby enabling a portion $E_4$ of the flow $E_1$ to be taken off that has the smallest burden of solid particles. This flow portion $E_4$ may be connected, in like manner to the drains 119, but using specific ducts, so as to constitute a source of water that is particularly clean or "clear water" that can be used in the installation I for specific purposes, such as cooling the alternator 4 or feeding a hydrostatic bearing. The number of ducts 110 fitted with a sheet 121 is determined as a function of the flow rate desired for clear water.

The invention is described above with reference to the flow in a duct 110 taking place in the direction of increasing radius of curvature $R_{110}$ of the duct 110. In other words, the upstream end 113 of a duct 110 is closer to the axis $X_{100}$ than its downstream end 116. It is nevertheless possible to provide a flow in the opposite direction, i.e. in a direction corresponding to decreasing radius $R_{110}$. Centrifugal acceleration of solid particles is likewise obtained under such circumstances.

In the second embodiment of the invention as shown in FIGS. 10 to 14, elements that are analogous to those of the first embodiment are given references that are identical.

The device 100 in this embodiment has twenty-five ducts 110, each of spiral shape in a plane perpendicular to an advance axis $X_{100}$ for advance of the flow E between an inlet zone 104 and an outlet zone 105. Each duct 110 is formed by a plane sheet 111 parallel to the axis $X_{100}$ and shaped into a spiral perpendicularly to said axis.

Each duct 110 is placed in a housing 131 defining an angular sector with an angle at the center α equal to about 14.4°. In a plane perpendicular to the axis $X_{100}$, each duct 110 presents a spiral profile centered on an axis $X_{110}$ parallel to the axis $X_{100}$, with a thickness $e_{110}$ that is much less than its width $l_{110}$ taken parallel to the axis $X_{100}$. The values of $e_{110}$ and $l_{110}$ may be the same or of the same order of magnitude as those mentioned above with reference to the first embodiment.

A conical portion 103B is placed inside an outlet collector 102 of the device 100 as in the first embodiment, and another conical portion 103A is placed in a diverging frustoconical inlet duct 101. The conical portion 103A serves to cause the flow E to diverge radially to a volume $V_3$ close to the duct 110 and situated radially inside the housings 131 and around a sheet 132 of circular shape centered on the axis $X_{110}$.

An elementary flow $E_1$ engaged in a duct 110 advances towards the axis $X_{110}$. In other words, the upstream end or inlet zone 113 of the duct 110 is further away from the axis $X_{110}$ than is its outlet zone. Each elementary flow $E_1$ passes via the duct 110 from the volume $V_3$ towards a central volume $V_4$ defined radially at the center of each duct 110. Each volume $V_4$ leaves via an opening 133 formed in an end face 134 of a housing 131 to a volume $V_2$ comparable to the volume $V_2$ of the first embodiment.

Nevertheless, flow in the opposite direction could be envisaged.

Spiders 108A and 108B serve to stiffen the conical portions 103A and 103B and the sheet 132.

A flow $E_1$ passes parallel to the axis $X_{100}$ between an inlet orifice 104 of the duct 101 and an outlet opening 105 of the collector 102 by passing around the portion 103A, through the volume $V_3$, through the ducts 110, and then through a volume $V_4$ and through the volume $V_2$ around the portion 103B.

As above, given the spiral profile of the ducts 110, each around a respective central axis $X_{110}$, an elementary flow $E_1$ engaged in a duct 110 is subjected to centrifugal acceleration with differential effect, thereby enabling the solid particles to be separated quickly and effectively by centrifuging from the molecules of water constituting the flow.

As in the first embodiment, a separator 117 is provided at the outlet 116 from each duct 110, thus enabling drains 119 to be fed with the portion $E_2$ of each elementary flow $E_1$ that carries the heaviest burden of solid particles. The separators are formed by plates 117 located in the vicinity of the portion of the sheet 111 that forms the radially outer portion of the downstream end 116 of each duct 110. The radial distance $d_{117}$ between each sheet 117 and the closest portion of the sheet 111 is not zero but it is much less than the thickness $e_{110}$. The ratio $d_{117}/e_{110}$ may have the same values as in the first embodiment. It is less than 1/50, and preferably about 1/100.

The portion $E_3$ of the flow $E_1$ that is not directed to a drain 119 thus reaches a central volume $V_4$ defined by the duct 110.

As in the first embodiment and according to an aspect of the invention that is not shown, a clear water takeoff may be provided where necessary from one or more of the ducts 110.

Whatever the embodiment, an energy conversion installation of the invention may include one or more devices 100 placed in parallel on the line feeding the hydraulic machine.

The technical characteristics of the various embodiments described may be combined within the ambit of the present invention.

The invention is described in the context of its use with a turbine 1. Nevertheless, it is also applicable to a pump or a turbine pump operating in turbine mode. Under such circumstances, the installation incorporating such a hydraulic machine may also convert mechanical energy or electrical energy into hydraulic energy.

The invention claimed is:

1. In a hydraulic energy installation where water flows through a turbine or turbine-pump, the improvement comprising:
a device for separating solid particles from an influent water flow feeding said turbine or turbine-pump, the device having flow inlet and outlet zones for the water flow that are spaced apart along an advance axis of flow advance through the device, wherein the device comprises a plurality of ducts placed in parallel, each having a mouth and a downstream end between the inlet zone and an outlet zone, wherein, in section perpendicular to the advance axis, each duct presents a section of spiral shape with a radius of curvature increasing from the mouth towards the downstream end or from the downstream end towards the mouth, each duct presents a thickness measured in a direction that is generally radial relative to the advance axis that is less than 10% of the width of said duct, measured parallel to said axis, and wherein, at its outlet zone, each duct is fitted with a flow separator capable of separating a first portion of an elementary flow flowing in the duct from a second portion thereof, the first portion being heavily burdened with solid particles while the second portion has a lighter burden of solid particles, the first portion exiting the device through a drain, while the second portion continues flowing to the turbine or turbine-pump.

2. An installation according to claim 1, wherein the thickness of each duct is less than 5% of the width of the duct.

3. An installation according to claim 2, wherein the thickness of each duct is less than 1% of the width of the duct.

4. An installation according to claim 1, wherein the thickness of each duct has a value of less than 100 mm.

5. An installation according to claim 4, wherein the thickness of each duct has a value of less than 60 mm.

6. An installation according to claim 5, wherein the thickness of each duct has a value equal to about 50 mm.

7. An installation according to claim 1, wherein each duct has an inlet section of flat rectangular shape with its long dimension parallel to the advance axis.

8. An installation according to claim 1, wherein the flow separator is formed by a partition placed in the duct close to a radial partition of the duct, and at a distance therefrom.

9. An installation according to claim 1, wherein, in the vicinity of its inlet, each duct includes a zone of radius of curvature measured in a plane perpendicular to the advance axis that is less than 25% of the maximum radius of curvature of the duct in said plane.

10. An installation according to claim 1, wherein the ducts are interleaved one in another around the advance axis.

11. An installation according to claim 1, wherein the ducts are distributed in respective angular sectors around the advance axis.

12. An installation according to claim 1, wherein each duct is formed by one or two metal sheets that are rectilinear in their direction parallel to the advance axis.

13. An installation according to claim 1, wherein said installation includes means for converting hydraulic energy into electrical or mechanical energy, or vice versa.

* * * * *